United States Patent
Chen et al.

(10) Patent No.: US 10,493,995 B2
(45) Date of Patent: Dec. 3, 2019

(54) WINDOW SHADE SYSTEM WITH RADIANT HEATING

(71) Applicant: GM GLOBAL TECHNOLOGY OPERATIONS LLC, Detroit, MI (US)

(72) Inventors: Kuo-huey Chen, Troy, MI (US); Taeyoung Han, Bloomfield Hills, MI (US); Bahram Khalighi, Birmingham, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 26 days.

(21) Appl. No.: 15/953,736

(22) Filed: Apr. 16, 2018

(65) Prior Publication Data

US 2019/0315372 A1    Oct. 17, 2019

(51) Int. Cl.
| B60W 50/00 | (2006.01) |
| B60J 1/20 | (2006.01) |
| B60H 1/00 | (2006.01) |
| F24H 3/04 | (2006.01) |

(52) U.S. Cl.
CPC ..... B60W 50/0098 (2013.01); B60H 1/00735 (2013.01); B60H 1/00892 (2013.01); B60J 1/2011 (2013.01); F24H 3/0429 (2013.01); B60W 2050/0002 (2013.01); B60W 2400/00 (2013.01); B60W 2550/12 (2013.01); B60W 2600/00 (2013.01); B60W 2710/30 (2013.01)

(58) Field of Classification Search
None
See application file for complete search history.

(56) References Cited

U.S. PATENT DOCUMENTS

| 6,407,365 | B1* | 6/2002 | De Prete, III | B60J 1/2011 160/370.21 |
| 6,609,747 | B1* | 8/2003 | Ruiz | B60J 1/2011 160/127 |
| 6,698,663 | B2* | 3/2004 | Wang | B60H 1/00735 236/49.3 |
| 6,852,955 | B1 | 2/2005 | Golan et al. | |
| 7,994,080 | B2 | 8/2011 | Teoret et al. | |
| 2006/0082192 | A1* | 4/2006 | Dubay | B60J 1/2011 296/214 |
| 2010/0019050 | A1* | 1/2010 | Han | B60H 1/00642 236/44 C |
| 2016/0270158 | A1 | 9/2016 | Comoglio et al. | |
| 2017/0136854 | A1* | 5/2017 | Dunne | B60J 1/2011 |
| 2017/0138627 | A1 | 5/2017 | Han et al. | |

OTHER PUBLICATIONS

Han et al., "A Model for Relating a Thermal Comfort Scale to EHT Comfort Index", 2004 SAE World Congress, Detroit, Michigan, Mar. 8-11, 2004 (Year: 2004).*
Han, T., et al. U.S. Patent Application entitled "PTC Radiant Heating System and Method".

* cited by examiner

Primary Examiner — Tamara L Weber
(74) Attorney, Agent, or Firm — Lorenz & Kopf, LLP

(57) ABSTRACT

Systems are provided for radiant heating by a window shade. A window shade system for a window of an enclosed space includes a window shade configured to cover at least a portion of the window. A radiant heating fabric extends over at least a portion of the window shade. A power supply supplies electric current to the radiant heating fabric.

20 Claims, 5 Drawing Sheets

WINDOW SHADE SYSTEM WITH RADIANT HEATING

TECHNICAL FIELD

The present disclosure generally relates to systems for controlling the temperature of a space, and more particularly relates to systems with radiant heating window shades.

INTRODUCTION

Providing a comfortable environment for occupants of a space typically involves the use of climate control such as through a heating, ventilating and air conditioning (HVAC) system. Providing a HVAC system enables maintaining a comfortable environment for occupants by adding or removing heat from the space. The HVAC system therefore works to counter unwanted heat or cold. Such systems often have a time lag between the start-up and achieving a desirable comfort level, particularly when a space has been unheated for an extended period of time. When heat loss or infiltration occurs or when surrounding components are at a low temperature, an occupant feels cold and the HVAC system only indirectly addresses those sources by warming internal air. In certain applications, a HVAC system may have and undesirably long response time or a limited capacity. In other applications there is a preference to reduce energy usage of a HVAC system.

Accordingly, it is desirable to provide systems that efficiently and effectively provide heating quickly and efficiently for a broad range of applications. Furthermore, other desirable features and characteristics of structures and methods for thermal control will become apparent from the subsequent detailed description and the appended claims, taken in conjunction with the accompanying drawings and the foregoing technical field and background.

SUMMARY

Systems are provided for window shades with radiant heating. In various embodiments, a window shade system for a window of an enclosed space includes a window shade configured to cover at least a portion of the window. A radiant heating fabric extends over at least a portion of the window shade. A power supply is configured to supply electric current to the radiant heating fabric.

In another embodiment, the window shade system includes a controller configured to control the supply of electric current to the radiant heating fabric based on an occupant comfort level.

In another embodiment, a HVAC system includes a blower associated with the window shade system. The controller is configured to supply electric current to the radiant heating fabric and to stop the blower when a temperature in the enclosed space is lower than a comfortable range.

In another embodiment, the window shade system includes a sensor configured to determine an ambient temperature outside the enclosed space, and another sensor configured to determine a cabin temperature inside the enclosed space. The controller is configured to control the supply of electric current to the radiant heating fabric based on the ambient temperature and the cabin temperature.

In another embodiment, the controller is configured to automatically deploy the window shade.

In another embodiment, the window shade is semi-transparent.

In another embodiment, the window shade is perforated to provide the semi-transparency.

In additional embodiments, a window shade system for a vehicle with a cabin and a window enclosing a portion of the cabin includes a window shade configured to cover at least a portion of the window. A radiant heating material is incorporated into the window shade. A power supply is connected with the radiant heating material. A HVAC system is configured to condition the cabin to a set temperature. A controller is configured to control the power supply to supply electric current to the radiant heating material and to control the HVAC system. The power supply and the HVAC system are controlled in coordination through a control module that operates to bring a cabin temperature in the cabin to a set point temperature.

In an additional embodiment, the window shade system includes an interface system with a control device configured to control deployment of the window shade. The interface system may include a second control device configured to control the HVAC system.

In an additional embodiment, an occupant state device is configured to sense the position of an occupant in the vehicle, and the controller is configured to deploy the window shade based on the sensed position of the occupant.

In an additional embodiment, the control module is configured to monitor equivalent homogeneous temperature in the cabin. When the monitored equivalent homogeneous temperature approaches the set temperature, the control module signals the power supply to reduce current to the window shade.

In an additional embodiment, the control module is configured to control the HVAC system in coordination with the window shade.

In an additional embodiment, the HVAC system includes a blower and the control module is configured to increase speed of the blower when the current to the window shade is reduced.

In an additional embodiment, the radiant heating material comprises a sheet material with integrated conductors configured to radiate heat when exposed to current supplied by the power supply. The conductors may comprise conductive threads.

In other embodiments, a window shade system for a vehicle with a cabin and a window enclosing a portion of the cabin includes a window shade configured to cover at least a portion of the window. A radiant heating material is incorporated into the window shade. A power supply is connected with the radiant heating material. A HVAC system is configured to condition the cabin to a set temperature. A sensor is configured to determine an ambient temperature outside the cabin, and another second sensor is configured to determine a cabin temperature inside the cabin. A controller is configured to: calculate an equivalent homogeneous temperature based on the ambient temperature and the cabin temperature; control the power supply to supply electric current to the radiant heating fabric; and control the HVAC system. The power supply and the HVAC system are controlled in coordination based on the equivalent homogeneous temperature.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application or its uses. Furthermore, there is no intention to be bound by any expressed or implied theory presented in the preceding technical field, introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As described in more detail below, windows, which are intended to be transparent, are typically a source of significant heat loss from an enclosed structure. In a number of embodiments as described herein, a window shade system with radiant heating includes a radiant heating fabric integrated into a window shade to both block cold ambient heat loss and provide efficient radiant heat for occupant heating comfort. The system is controllable to provide instant heating comfort to the occupants and is deployable to immediately shield occupants from cold ambient. The system has low power consumption with noiseless operation.

Figure 1:
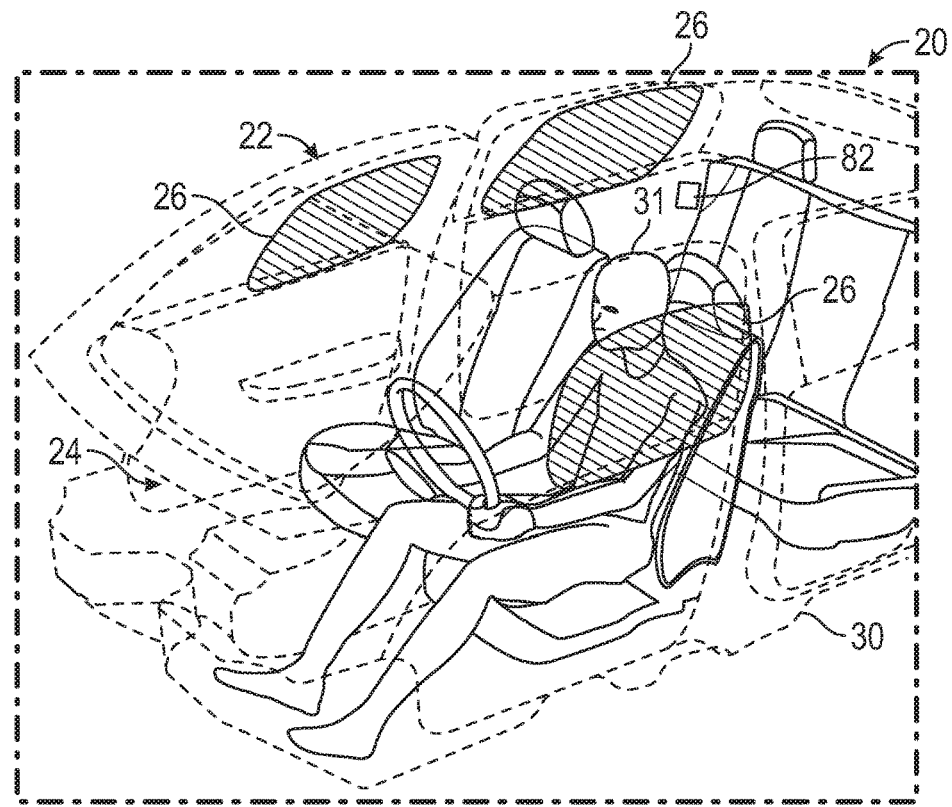
FIG. 1 is a schematic illustration of a vehicle including a window shade system with radiant heating, in accordance with various embodiments.
Figure 2:
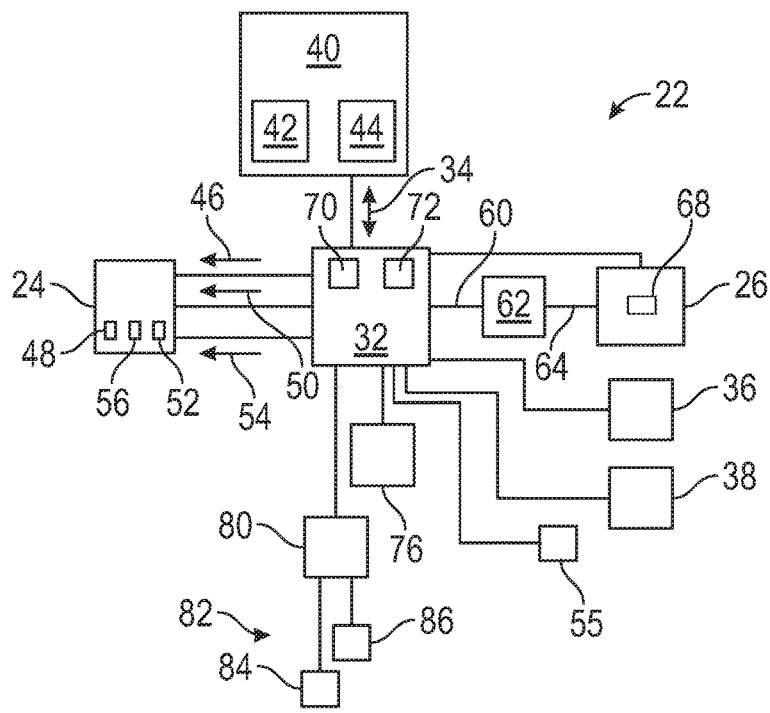
FIG. 2 is a block diagram illustrating the window shade system of the vehicle of FIG. 1, in accordance with various embodiments.

FIG. 1 illustrates a device for housing occupants, according to an exemplary embodiment. In the current example, the device is a vehicle 20 and specifically is a ground vehicle such as an automobile of any one of a number of different types. In other embodiments, the vehicle 20 may be a plane, boat, another type of mobile device, or a stationary structure such as a building or container. As described in greater detail below, the vehicle 20 includes a window shade system 22 with a radiant heating element that includes a radiant heating fabric for increasing the comfort level of occupants of the vehicle 20. Referring additionally to FIG. 2, the window shade system 22 in general, receives inputs from sources on-board the vehicle 20, processes the inputs, and provides outputs to deploy and control heat output. In the depicted embodiment, the window shade system 22 generally includes, or cooperates with an HVAC system 24 and at least one window shade 26. It will be appreciated that the number of window shades 26 will vary and any number of individual shades on any number of windows may be included. In addition, more than one window shade 26 may be included for a single window. The window shades 26 may be modular and attached to, or hung over, a window. The window shades 26 may be deployable, including by scrolling, rolling, folding, expanding/contracting, through louvers or in other ways.

The vehicle 20 generally includes a body 30 that substantially encloses components of the vehicle 20, including any occupants 31. The vehicle 20 has various vehicle systems that are controlled by one or more controllers 32. These vehicle systems include the window shade system 22 and the HVAC system 24. The window shade system 22 includes one or more ambient air temperature sensors 36 for measuring the temperature of external ambient air ($T_a$) outside the vehicle 20. The sensor 36 is communicatively coupled with the controller 32 and provides a signal and/or other information thereto to discern $T_a$. A cabin air temperature sensor 38 is provided for measuring air temperature ($T_c$) inside the cabin of the vehicle 20. The senor 38 is communicatively coupled with the controller 32 and provides a signal and/or other information thereto to discern $T_c$. An interface system 40 is provided, such as in the instrument panel of the vehicle 20, or at another location appropriate for the application. The interface system 40 is communicatively coupled with the controller 32 and provides signals 34 and/or other information thereto with regard to selections made by the occupant 31. The signals 34 include information from which the controller 32 discerns a temperature setting desired by occupants 31 such as the driver and front passenger of a vehicle, which are representative of a set point temperature ($T_{sp}$). The inputs $T_a$, $T_c$ and $T_{sp}$ are provided to a controller 32. The set point temperature $T_{sp}$ is provided through a control device such as a button 42 in the interface system 40. The interface system 40 also includes another control device, such as a button 44 to control deployment of the window shade 26 through the signals 34. In a number of examples, instead of buttons 42, 44, the interface system 40 may comprise one or more sensors associated with user interfaces such as vehicle touch screens, rotary knobs, and/or other types of user interfaces within the vehicle 20 for receiving inputs from the occupant 31.

While the components of window shade system 22 are depicted as being part of the same system, it will be appreciated that in certain embodiments these features may comprise multiple systems. In addition, in various embodiments the window shade system 22 may comprise all or part of, and/or may be coupled to, various other vehicle devices and systems, such as, among others, the HVAC system 24, and/or one or more other systems of the vehicle 20.

The controller 32 accepts information from the various sources, processes that information, and provides control commands based thereon to effect outcomes such as operation of the vehicle 20 and its systems, including the window shade system 22. In the depicted embodiment, the controller 32 includes a processor 70, a memory device 72, and is coupled with a storage device 76. The processor 70 performs the computation and control functions of the controller 32, and may comprise any type of processor or multiple processors, single integrated circuits such as a microprocessor, or any suitable number of integrated circuit devices and/or circuit boards working in cooperation to accomplish the functions of a processing unit. During operation, the processor 70 executes one or more programs that may be contained within the storage device 76 and, as such, controls the general operation of the controller 32, generally in executing the processes described herein.

The memory device 72 may be any type of suitable memory. For example, the memory device 72 may include volatile and nonvolatile storage in read-only memory (ROM), random-access memory (RAM), and keep-alive memory (KAM), for example. KAM is a persistent or non-volatile memory that may be used to store various operating variables while the processor 70 is powered down. The memory device 72 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 32. In certain examples, the memory device 72 is located on and/or co-located on the same computer chip as the processor 70. In the depicted embodiment, the storage device 76 stores the above-referenced programs along with one or more stored values.

The storage device 76 stores data for use in automatically controlling the vehicle 20 and its systems. The storage device 76 may be any suitable type of storage apparatus, including direct access storage devices such as hard disk drives, flash systems, floppy disk drives and optical disk drives. In one exemplary embodiment, the storage device 76 comprises a source from which the memory device 72 receives the programs that execute one or more embodiments of one or more processes of the present disclosure, such as the steps of the processes (and any sub-processes thereof) described further below. In another exemplary embodiment, a program may be directly stored in and/or otherwise accessed by the memory device 72. The programs represent executable instructions, used by the electronic controller 32 in processing information and in controlling the vehicle 20 and its systems. The instructions may include one or more separate programs, each of which comprises an ordered listing of executable instructions for implementing logical functions. The instructions, when executed by the processor 70 support the receipt and processing of signals such as from sensors, perform logic, calculations, methods and/or algorithms for automatically controlling the components and systems of the vehicle 20. The processor 70 may generate control signals for the window shade system 22 and the HVAC system 24 for automatic control based on the logic, calculations, methods, and/or algorithms.

Methods, algorithms, or parts thereof may be implemented in a computer program product of the controller 32 including instructions or calculations carried on a computer readable medium for use by one or more processors to implement one or more of the method steps or instructions. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program may be executed on one processor or on multiple processors in communication with one another.

In a number of embodiments, the controller 32 produces signals 46 for delivery to an HVAC blower 48 and may set the operational state and/or speed thereof. The controller 32 produces signals 50 to set the target discharge air temperature of the HVAC system 24 through an actuator 52, such as an actuator that displaces a damper or adjusts a valve. Closed loop feedback is provided to the controller 32. The controller 32 produces signals 54 that are delivered to actuator(s) 56 to set the operational mode of the HVAC system such as heating through a heater system, or cooling through an air conditioning system, or ventilating to provide outside air to the cabin.

In the current embodiment, the controller 32 provides signals 60 to a power supply 62 to control the supply of power through conductors 64 to heating elements 68 in the window shade 26. The heating elements 68 may be embedded particles, fibers, filaments, or other conductors in a radiant heating fabric that radiate heat when supplied with current. In the current embodiment, the window shade 26 includes conductive threads as the heating elements 68. In other embodiments, a thermoplastic material with a conductive filler may be used. In some embodiments, the conductive material comprising the heating elements resides on the surface of the window shade 26 that faces the occupant 31. In any embodiment, the conductive material may be a carbon-based material, or another type of conductive material that produces radiant heat when a current is applied by the power supply 62. The window shade 26, the blower 48, the actuator 52, the actuator(s) 56, actuator devices 55 and the power supply 62 may each be communicatively coupled with the controller 32 to receive signals therefrom, directly, or indirectly such as through intermediary modules or controllers, and to provide information thereto, when relevant, such as feedback.

An occupant state system 80 includes one or more occupant state devices 82 that provide information or data on aspects of an occupant of the vehicle 20. The occupant state devices 82 may include, but are not limited to, position sensors 84 to detect the location of occupants/passengers, biometric sensors 86 for sensing biological features of an occupant, such as temperature(s), and other devices. The controller 32 uses the occupant state information to determine which window shades 26 to deploy and/or energize through the power supply 62. For example, if the rear passenger seat does not include an occupant, then the controller 32 will not supply power to the window shade 26 on the rear passenger side window. In some embodiments where the window shades 26 are automatically deployed, even for a seat that does not contain an occupant, the controller 32 may be programmed to deploy the adjacent window shade 26 to block heat loss, depending on the thermal state of the vehicle 20. In other embodiments, the window shade(s) are deployed in response to occupant 31 inputs through the interface system 40.

Figure 3:
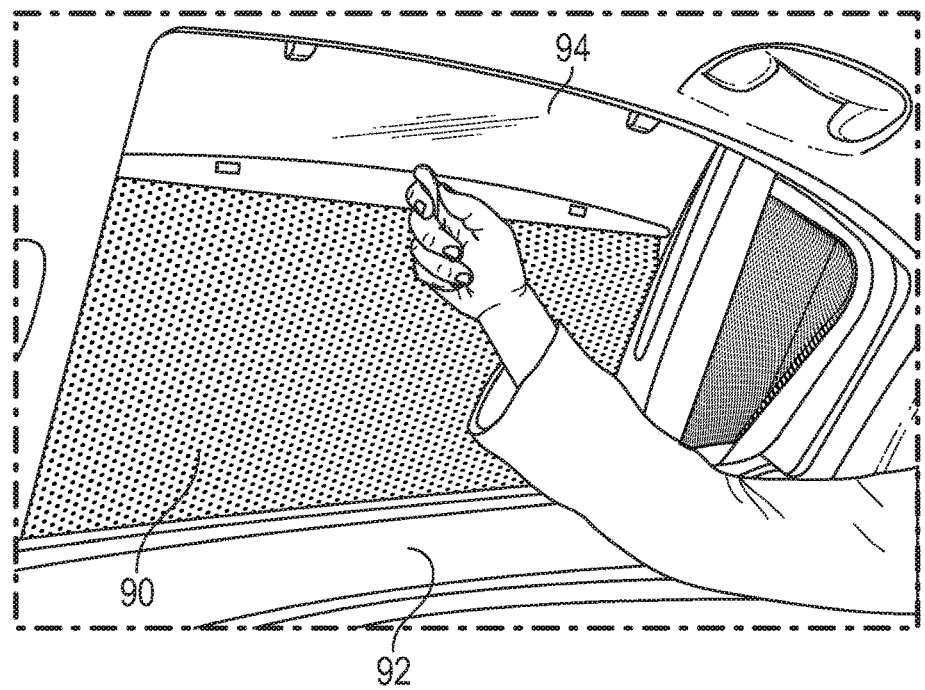
FIG. 3 is a perspective illustration of a window shade for use with the vehicle of FIG. 1, in accordance with various embodiments.

Referring to FIG. 3, a manually deployed window shade 90 is illustrated and is usable as the window shades 26. The window shade 90 retracts into the door panel 92 when not in use and substantially completely covers the window 94 when deployed. The material of the window shade 90 may be coated with a reflective material on its outside surface to also serve to reduce the heat load on the vehicle 20 during warm external conditions when heating isn't required. In this embodiment, the window shade 90 is retracted onto a roller (not shown). The window shade material is flexible and includes fabric with radiant heating elements in the form of conductive fibers that heat up when exposed to electric current. The conductive fibers are connected with the power bus of the vehicle 20, such as the 12-volt system for heating power through the power supply 62 (shown in FIG. 2). Other power sources may be used as are available in a given application. The power to the conductive fibers is controlled using PWM in the power supply 62 based on the ambient $T_a$ and $T_c$ to provide optimal comfort. For example, the power supply 62 is controlled to supply current with PWM control at 0% for a cabin temperature $T_c$ greater than twenty-five degrees Celsius and 100% for the cabin temperature less than zero degrees Celsius. Between zero and twenty-five degrees Celsius, PWM is varied in relation to the cabin temperature $T_c$ with more power supplied at lower temperatures.

Figure 4:
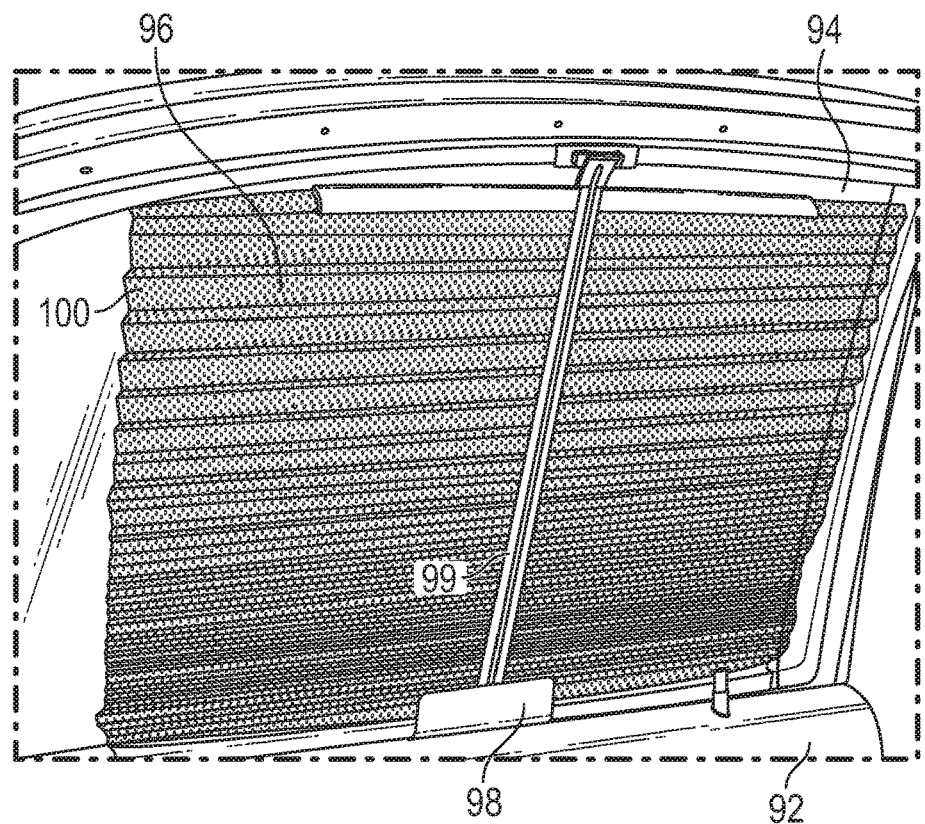
FIG. 4 is a perspective illustration of another window shade for use with the vehicle of FIG. 1, in accordance with various embodiments.

Referring to FIG. 4, an automatically deployed window shade 96 is illustrated and is usable as the window shades 26. The window shade 96 collapses/retracts into a stored state above the door panel 92 when not in use and covers the window 94 substantially completely when deployed. The material of the window shade 96 may be coated with a reflective material on its outside surface to also serve to reduce the heat load on the vehicle during warm external conditions. The window shade 96 includes an actuator 98 to move the shade between deployed and stored states, with an arm 99 driven by the actuator 98 in an up-and-down direction. The window shade material is flexible and includes fabric with radiant heating elements in the form of conductive particles that heat up when exposed to electric current. The conductive particles are connected with the power bus of the vehicle 20, such as the 12-volt system for heating power through the power supply 62 (shown in FIG. 2). Other power sources may be used as are available in a given application. Power to the conductive particles is controlled using PWM in the power supply 62 based on the ambient $T_a$ and $T_c$ to provide optimal comfort as described above. The material of the window shade 96 includes multiple perforations 100 to provide semi-transparency for visibility through the window 94. Other forms of creating transparency may be employed, such as by providing the shade in a grid structure, using transparent material, or other approaches.

Figure 5:
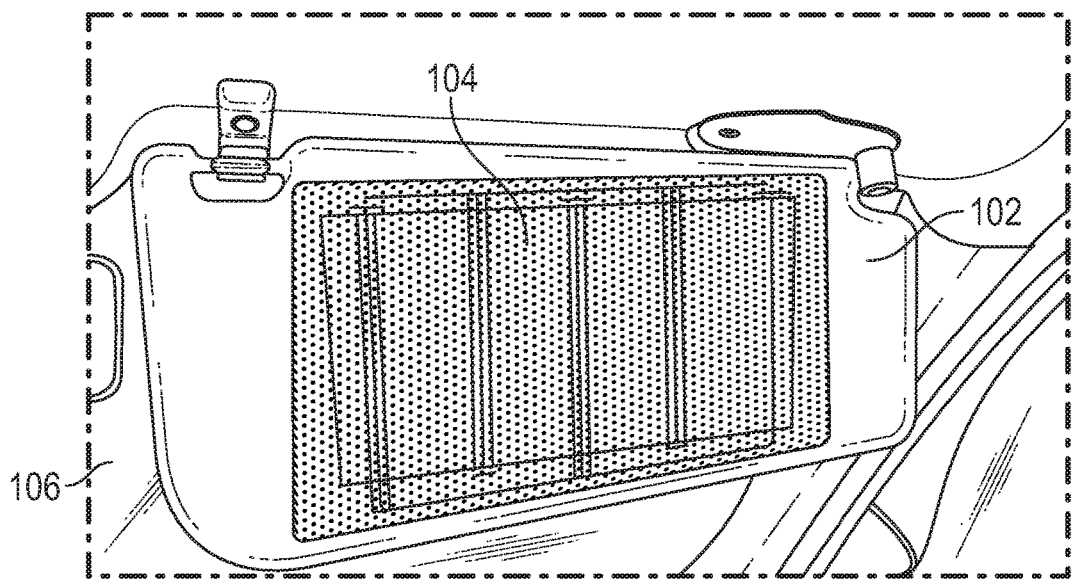
FIG. 5 is a perspective illustration of a sun visor type window shade for use with the vehicle of FIG. 1, in accordance with various embodiments.

Referring to FIG. 5, a window shade 102 in the form of a sun visor includes a fabric heating area 104. In this embodiment, the sun visor blocks only a portion of the windshield 106 and is deployed in the typical manner by being rotated downward. The material of the window shade 102 may be any of the above-mentioned materials with conductive elements that radiate heat when exposed to electric current. In this example, semi-transparency is not necessary due to inclusion on the sun visor, which is intended to block light. The conductive particles are connected with the power bus of the vehicle 20, such as the 12-volt system for heating power through the power supply 62 (shown in FIG. 2). Other power sources may be used as are available in a given application. Power to the conductive particles is controlled using PWM in the power supply 62 based on the ambient $T_a$ and $T_c$ to provide optimal comfort as described above.

Figure 6:
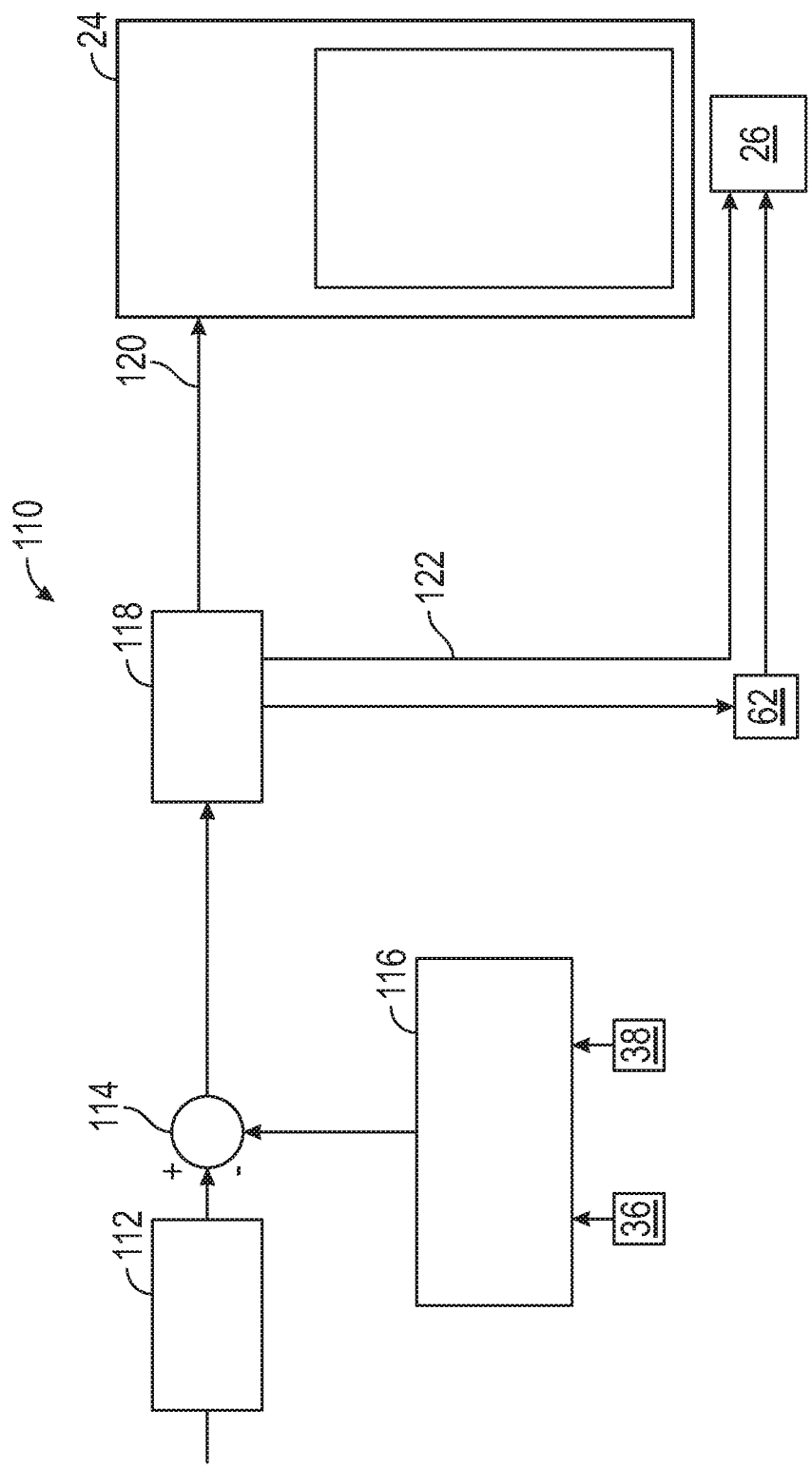
FIG. 6 is a diagram of automatic climate control using a window shade system with radiant heating, in accordance with various embodiments.

In a number of variations as illustrated in FIG. 6, an automatic climate control system 110 based on a cabin equivalent homogeneous temperature (EHT) is provided through modules that may be included in the controller 32, in multiple controllers, or in another controller in communication with the controller 32. In an enclosed space such as the cabin of the vehicle 20, occupant thermal comfort may be affected by environmental parameters that influence body heat loss such as surrounding air temperature, mean radiant temperature, air velocity, direct solar load, and humidity. One such parameter is breath air temperature which may be defined as the dry bulb temperature of the air near an occupant's face. Another parameter, mean radiant temperature may be defined as the uniform surface temperature of an imaginary enclosure in which an occupant would exchange the same amount of radiant heat as in the actual non-uniform space. The factors that affect thermal comfort are those that affect the body heat loss. Accordingly, heat loss through the windows 94 of the vehicle 20 has an effect on how the occupant 31 perceives thermal comfort/discomfort. The EHT is a recognized measure of the total heat loss from the human body that can be used to characterize highly non-uniform thermal environments. It is particularly useful in relation to a confined space such as a vehicle passenger compartment due to the complex interaction of radiation and convection heat fluxes. EHT expresses the effects of combined thermal influences in a single variable that is associated with occupant thermal comfort. EHT may be determined according to known methods such as by calculation at an EHT evaluation module 112 using $T_a$ and $T_c$. EHT is a quantity that integrates the effects of breath level air temperature, air velocity and mean radiation to reflect an occupant body heat loss and thus accurately expresses combined thermal effects on an occupant in a single variable that accurately reflects occupant thermal comfort.

Calculations to determine EHT are carried out in the controller 32 using known methods. The monitored and evaluated EHT is used as feedback to make adjustments in the HVAC system for thermal comfort of the occupant(s) 31. A lookup table may be provided for EHT set point based on input parameters for occupant thermal comfort. Comparator module 114 receives an input from set point module 116 representative of the cabin temperature set point corrected by radiant heating from the window shade(s) 26. For example, a lookup table is used that considers $T_c$ and a radiant heating input parameter to provide a set point for control of the HVAC system 24 and the window shade(s) 26 in relation to the cabin EHT. Comparator module 114 subtracts the set point provided from set point module 116 from the EHT evaluation module 112 and issues a control error 116, also referred to as ΔEHT. For example, a negative control error indicates that the HVAC system 24 and/or the window shade 26 must adjust the EHT upward by the ΔEHT. The control error 116 is provided to EHT control module 118.

The EHT control module 118 determines a control value $Y_n=10 \cdot T_a+Y_{pi}(\Delta EHT_c)$ that may be a combination of steady state $(10 \cdot T_a)$, and transient $(Y_{pi}(\Delta EHT_c))$, temperature based components. The control value $Y_{pi}$ is determined by $K_p(\Delta EHT_c)+K_i\int(\Delta EHT_c)d\tau$, where $K_p$ is a proportional gain constant and $K_i$ is integral gain. In a number of embodiments, the control value $Y_{pi}$ may be read from a lookup table by the controller 32 where a list of control values are listed in relation to control error value. The determined control values $Y_n$, are provided through signals 120, 122 respectively, where commands are sent to the HVAC system 24 to set a discharge air temperature using the actuator 52, the speed of blower 48, and the HVAC mode through the actuators 56, and to the window shade 26 for deployment. A command is also delivered to the power supply 62 to supply current to the window shade 26 for radiant heating of the occupant 31 at a PWM percentage suitable for the conditions. Feedback provided by the sensors 36, 38 may be used to adjust the control value as the cabin temperature approaches the set point temperature.

In scenarios where the EHT is significantly below a comfort zone, the EHT control module deploys the window shade 26 and signals the power supply 62 to supply current to the window shade 26. For example, on an exemplary comfort scale, a comfort rating of 1 may be classified as cold, a comfort rating of 2 may be classified as very cool, a comfort rating of 3 may be classified as cool, a comfort rating of 4 may be classified as slightly cool, a comfort rating of 5 may be classified as comfortable, a comfort rating of 6 may be classified as slightly warm, a comfort rating of 7 may be classified as warm, a comfort rating of 8 may be classified as too warm, and a comfort rating of 9 may be classified as hot. The comfort ratings are determined in the EHT control module 118, such as from a lookup table using the ΔEHT. If the EHT falls in the 1-3 comfort rating range, the EHT control module 118 commands the deployment of the window shade 26 and the supply of current thereto by the power supply 62. Concurrently, such as in a vehicle with an engine coolant based heating system which is slow to warm up, the EHT control module 118 slows or disables the blower 48 so that it does not blow cold air. The automatic climate control system 110 continues to monitor EHT and as the ΔEHT becomes lower, meaning the cabin is warming toward a comfortable comfort rating, the EHT control module 118 signals the power supply 62 to reduce PWM current to the window shade 26 and/or increase speed of the blower 48.

Figure 7:
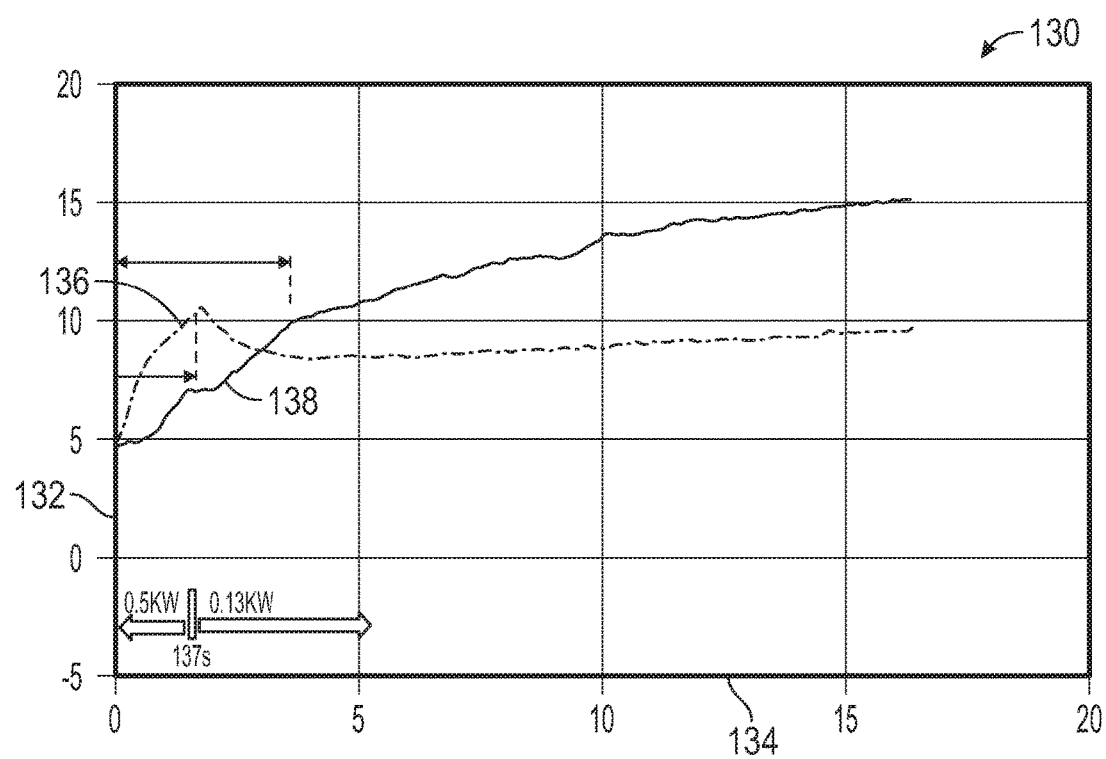
FIG. 7 is a graph of whole body EHT, with EHT in degrees Celsius along the vertical axis and time in minutes along the horizontal axis, in accordance with various embodiments.

Referring to FIG. 7, a graph 130 of EHT in degrees Celsius versus time in minutes shows the effect of the window shade 26 in instilling a warm feeling in the occupant 31 as compared to a baseline conventional forced air heating system. The vertical axis 132 represents EHT in degrees Celsius and the horizontal axis 134 represents time is minutes from the startup of the vehicle 20. The example begins at an EHT of approximately 5 degrees Celsius. Curve 136 demonstrates the effect of the window shade 26 with no heating provided by the HVAC system 24. The window shade 26 is supplied by the power supply 62 with 0.5 kilowatts delivered during an initial two-minute period, which is then reduced to 0.13 kilowatts and held constant for demonstration purposes. Curve 136 shows that the window shade 26 with radiant heating warms the occupant 31 over five degrees Celsius in the initial two-minute time period. Curve 138 demonstrates the effect of the HVAC system 24 with no heating provided by the window shade 26. Curve 138 shows that the HVAC system 24 warms the occupant 31 slightly less than 2.5 degrees Celsius in the initial two-minute time period. Accordingly, the window shade 26 with radiant heating is more effective in initial warming of the occupant 31.

Accordingly, when rapid warming of an occupant is needed, a window shade system with radiant heating provides an effective solution. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A window shade system for a window of an enclosed space, the system comprising:
    a window shade configured to cover at least a portion of the window;
    a radiant heating fabric extending over at least a portion of the window shade;
    a power supply configured to supply electric current to the radiant heating fabric; and
    a controller configured to control the supply of electric current to the radiant heating fabric based on an occupant comfort level.

2. The system of claim 1, wherein the window shade comprises a sun visor.

3. The system of claim 1, comprising a heating, ventilation and air conditioning system including a blower, wherein the controller is configured to supply electric current to the radiant heating fabric and to stop the blower when a temperature in the enclosed space is lower than a comfortable range.

4. The system of claim 1, comprising:
    a first sensor configured to determine an ambient temperature outside the enclosed space;
    a second sensor configured to determine a cabin temperature inside the enclosed space; and
    wherein the controller is configured to control the supply of electric current to the radiant heating fabric based on the ambient temperature and the cabin temperature.

5. The system of claim 1, wherein the controller is configured to automatically deploy the window shade.

6. The system of claim 1, wherein the window shade is semi-transparent.

7. The system of claim 6, wherein the window shade is perforated to provide the semi-transparency.

8. A window shade system for a vehicle with a cabin and a window enclosing a portion of the cabin, the system comprising:
    a window shade configured to cover at least a portion of the window;
    a radiant heating material incorporated into the window shade;
    a power supply connected with the radiant heating material;
    a heating, ventilation and air conditioning (HVAC) system configured to condition the cabin to a set temperature; and
    a controller configured to:
        control the power supply to supply electric current to the radiant heating material; and
        control the HVAC system;

wherein the power supply and the HVAC system are controlled in coordination through a control module that operates to bring a cabin temperature in the cabin to a set point temperature.

9. The system of claim 8, comprising:
a first sensor configured to determine an ambient temperature outside the cabin; and
a second sensor configured to determine the cabin temperature inside the cabin;
wherein the controller is configured to control the power supply based on the ambient temperature and the cabin temperature.

10. The system of claim 8, wherein the controller is configured to automatically deploy the window shade.

11. The system of claim 8, wherein the window shade is semi-transparent.

12. The system of claim 8, comprising an interface system with a control device configured to control deployment of the window shade.

13. The system of claim 12, wherein the interface system includes a second control device configured to control the HVAC system.

14. The system of claim 12, comprising an occupant state device configured to sense the position of an occupant in the vehicle, wherein the controller is configured to deploy the window shade based on the sensed position of the occupant.

15. The system of claim 8, wherein the control module is configured to:
monitor equivalent homogeneous temperature (EHT) in the cabin; and
when the EHT approaches the set temperature, signal the power supply to reduce current to the window shade.

16. The system of claim 15, wherein the control module is configured to control the HVAC system in coordination with the window shade.

17. The system of claim 15, wherein the HVAC system includes a blower and the control module is configured to increase speed of the blower when the current to the window shade is reduced.

18. The system of claim 8, wherein the radiant heating material comprises a sheet material with integrated conductors configured to radiate heat when exposed to current supplied by the power supply.

19. The system of claim 18, wherein the conductors comprise conductive threads.

20. A window shade system for a vehicle with a cabin and a window enclosing a portion of the cabin, the system comprising:
a window shade configured to cover at least a portion of the window;
a radiant heating material incorporated into the window shade;
a power supply connected with the radiant heating material
a heating, ventilation and air conditioning (HVAC) system configured to condition the cabin to a set temperature;
a first sensor configured to determine an ambient temperature outside the cabin;
a second sensor configured to determine a cabin temperature inside the cabin;
and
a controller configured to:
calculate an equivalent homogeneous temperature (EHT) based on the ambient temperature and the cabin temperature;
control the power supply to supply electric current to the radiant heating fabric; and
control the HVAC system;
wherein the power supply and the HVAC system are controlled in coordination based on the EHT.

* * * * *